(12) United States Patent
Chebiyyam et al.

(10) Patent No.: US 11,516,613 B1
(45) Date of Patent: Nov. 29, 2022

(54) EMERGENCY SOUND LOCALIZATION

(71) Applicant: Zoox, Inc., Foster City, CA (US)

(72) Inventors: Venkata Subrahmanyam Chandra Sekhar Chebiyyam, San Francisco, CA (US); Nam Gook Cho, Cupertino, CA (US); Jonathan Tyler Dowdall, San Francisco, CA (US); Subasingha Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 44 days.

(21) Appl. No.: 17/077,746

(22) Filed: Oct. 22, 2020

(51) Int. Cl.
*H04S 7/00* (2006.01)
*G01H 7/00* (2006.01)
*G06K 9/62* (2022.01)
*G05D 1/02* (2020.01)
*G05D 1/00* (2006.01)

(52) U.S. Cl.
CPC ............... *H04S 7/30* (2013.01); *G01H 7/00* (2013.01); *G05D 1/0088* (2013.01); *G05D 1/0255* (2013.01); *G06K 9/6267* (2013.01); *G05D 2201/0213* (2013.01); *H04S 2400/01* (2013.01); *H04S 2400/11* (2013.01)

(58) Field of Classification Search
CPC ........ G05D 1/0088; G05D 2201/0213; B60W 50/0098; H04R 3/005; H04R 2499/13

USPC ....................................................... 381/86, 92
See application file for complete search history.

(56) References Cited

U.S. PATENT DOCUMENTS

| | | | |
|---|---|---|---|
| 9,517,767 B1 * | 12/2016 | Kentley | B60R 21/01 |
| 2018/0374347 A1 * | 12/2018 | Silver | G06F 16/683 |
| 2020/0213728 A1 * | 7/2020 | Lopatka | G01S 3/8022 |
| 2021/0125494 A1 * | 4/2021 | Cho | G01S 3/8083 |
| 2021/0150230 A1 * | 5/2021 | Smolyanskiy | B60W 60/0016 |
| 2021/0302987 A1 * | 9/2021 | Chebiyyam | G01S 17/89 |
| 2021/0302988 A1 * | 9/2021 | Chebiyyam | G01S 17/89 |
| 2022/0060822 A1 * | 2/2022 | Chng | H04R 3/005 |
| 2022/0126878 A1 * | 4/2022 | Moustafa | B60W 60/0053 |

* cited by examiner

*Primary Examiner* — Alexander Krzystan
(74) *Attorney, Agent, or Firm* — Lee & Hayes, P.C.

(57) ABSTRACT

Techniques for determining information associated with sounds detected in an environment based on audio data are discussed herein. Audio sensors of a vehicle may determine audio data associated with sounds from the environment. Sounds may be caused by objects in the environment such as emergency vehicles, construction zones, non-emergency vehicles, humans, audio speakers, nature, etc. A model may determine a classification of the audio data and/or a probability value representing a likelihood that sound in the audio data is associated with the classification. A direction of arrival may be determined based on receiving classification values from multiple audio sensors of the vehicle, and other actions can be performed or the vehicle can be controlled based on the direction of arrival.

20 Claims, 5 Drawing Sheets

EMERGENCY SOUND LOCALIZATION

BACKGROUND

Vehicles often encounter various vehicles in an environment which use one or more of audial or visual cues to demonstrate priority, such as emergency vehicles. As an example, during an emergency an emergency vehicle may drive rapidly and may use lights and/or sirens to announce its presence. As the emergency vehicle has a higher priority in driving, non-emergency vehicles should yield to the emergency vehicle. In the context of an autonomous vehicle, it may be important for the autonomous vehicle to have a scheme to detect the emergency vehicle and respond to an occurrence of the emergency vehicle in its environment, especially in complex environments that can make such detections challenging.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
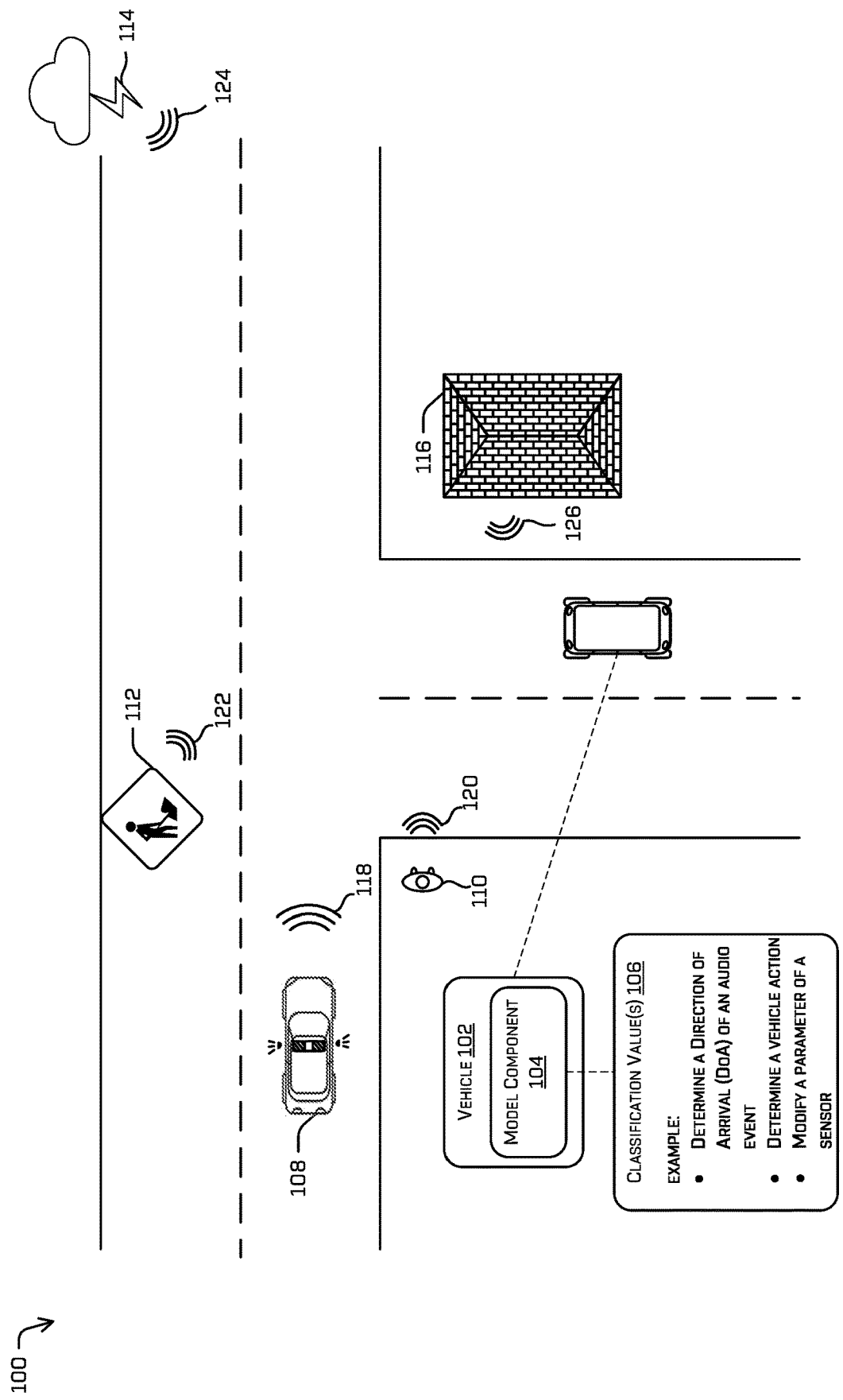
FIG. 1 is an illustration of an example environment, in which an example vehicle applies a model to predict a classification value.

This disclosure is directed to techniques for determining classification information associated with sounds detected in an environment of a vehicle. Such classification information can be determined by a model, such as a machine learned model, and can be used to determine a direction of arrival associated with the sound and/or to determine information for further processing. In some examples, a vehicle (such as an autonomous vehicle) may include audio sensors to determine audio data based on sounds from the environment. In some examples, sounds may be caused by objects in the environment such as emergency vehicles, construction zones, non-emergency vehicles, humans, audio speakers, nature, etc. A computing device of the vehicle may input the audio data into a model to determine a classification of the audio data and/or a probability value representing a likelihood that sound in the audio data is associated with the classification. In some complex environments, it may be difficult to distinguish between a sound that affects operation of the vehicle (e.g., causes the vehicle to take an action to avoid an object) and a sound that does not affect operation of the vehicle. Using the techniques described herein, a vehicle may receive classification values from a model usable by the vehicle to quickly and/or preemptively navigate the vehicle in an environment, thereby improving safety of the vehicle.

In some examples, based on the collected audio data representing various types of sounds in the environment, multiple audio events occurring in the environment may be determined. To enable the vehicle to respond quickly and accurately to a sound of a specific class, the model may classify the sounds associated with the audio data with varying degrees of confidence. For instance, the model may classify a siren of an emergency vehicle as an emergency audio event and the model may classify a barking dog as a non-emergency event. In some examples, the model may classify a sound detected by separate sensors, and determine a classification value for audio data from each of the separate sensors.

In some examples, a machine learned model determines classification value(s) associated with audio data from one or more sensors. For instance, the model may receive, as input, first audio data from a first audio sensor and second audio data from a second audio sensor and output a first classification of the first audio data and a second classification of the second audio data. In some examples, the first classification may comprise a first value representing a likelihood that the first audio data is associated with the first classification and/or the second classification may comprise a second value representing a likelihood that the second audio data is associated with the second classification. For example, the first value and/or the second value may be a probability value indicating a confidence in whether the sensor classified the audio event correctly (e.g., the first classification indicates a 90% likelihood that the first sensor heard an emergency event associated with a siren and the second classification indicates a 70% likelihood that the second sensor heard an emergency event associated with a siren).

A direction of arrival (DoA) can be determined based at least in part on the classification values. Continuing with the example above where a first sensor captured audio and classified the audio as representing a siren with a 90% likelihood and a second sensor captured audio and classified the audio as representing a siren with 70% likelihood, the classification values can be input to a model (along with the orientations of the microphones) to determine the location associated with the sound. For example, the model can use heuristics and/or machine learning techniques to locate a sound, where the higher a classification value associated with the sound generally indicates that the sound is located in a direction associated with the sensor. Of course, there may be a plurality of sensors disposed about a vehicle each capturing audio data. Accordingly, a plurality of classification values can be determined to determine the DoA based on the distribution of classification value(s) about the vehicle.

In some examples, the techniques for determining classification values can include applying and/or training a model to predict or otherwise determine a likelihood that the audio event is associated with an audio event classifier. For example, the audio event classifier may classify an event as an emergency event or a non-emergency event and may classify the audio event more specifically within each broad class. The audio event classifier may be trained to determine an event type according to a sound class. The training of the audio event classifier may be based at least in part on historical data associated with past events which occurred in the environment of the vehicle and/or features/parameters that were used to identify such past events. The features/ parameters that were used to identify the past events may be determined based at least in part on the audio data and/or video data captured by the vehicle. For examples including emergency vehicles, the audio event classifier may be associated with a machine learned model that is pre-trained using training data. The training data may comprise past determined sirens generated by the emergency vehicles, audio data associated with the past determined sirens, and features extracted from the audio data that were used to determine the past determined siren of the emergency vehicles. The audio event classifier may be periodically trained using the feedback from identified emergencies in real-time. Examples of an audio event classifier are provided in U.S. patent application Ser. No. 16/661,898, titled "Emergency Vehicle Detection," filed Oct. 23, 2019, the entirety of which is herein incorporated by reference.

In various examples, the classification of the audio event may include an emergency audio event class comprising an ambulance siren class, a police siren class, a fire truck siren class, etc., or anon-emergency audio event class comprising an engine sound class, a music sound class, a thundering sound class, a speech sound class, a power tool sound class, and so on. By associating different sound classes with different audio event classifiers, the model can determine whether an audio event is associated with sound specific to each class. Generally, each audio classifier can be associated with frequency information and/or intensity information that may be compared to frequency information and/or intensity information of an audio event to classify the audio event.

In some examples, the classification values output by the machine learned model may be used by a computing device to determine an occurrence of an audio event (e.g., the audio event is an emergency audio event). For instance, by comparing classification values one to another and/or to a threshold, the computing device can determine whether the sound occurred in the audio event and generate one or more signals to other systems of the vehicle, such as for use in vehicle planning (e.g., determining a trajectory for the vehicle). By way of example and not limitation, output by the model may indicate that a first sensor is 90% certain of detecting a siren while a second sensor is 70% certain of detecting a siren and because each is above a threshold value (e.g., 50%), the occurrence of the siren took place in the audio event. Further, as noted above, the direction of arrival may be determined by the relative classification values and the poses of the audio sensors.

Based on determining that the audio event occurred, the classification values output by the model may be sent to a vehicle computing device that is configured to determine a vehicle action (e.g., control the vehicle, calibrate a sensor, determine a map visually showing the emergency event, determine perception data, and so on) and/or be used in one or more additional processes. For instance, the vehicle computing device may determine a direction of arrival (DoA) of the audio event relative to the vehicle. In various examples, the vehicle computing device may receive pose data associated with at least one audio sensor and determine the direction of arrival associated with the audio event based at least in part on the first classification value, the second classification value, and the pose data. Additional details for determining a direction of arrival are discussed throughout this disclosure.

In some examples, the vehicle computing device may control the vehicle in the environment based at least in part on the direction of arrival value associated with the audio event. However, in other examples, the vehicle computing device may control the vehicle in the environment based at least in part on the classification values without determining a direction of arrival of the audio event. For instance, the model may provide functionality of an attention system for the vehicle by identifying sounds of interest and communicating information about the identified sounds to other components of the vehicle computing device (e.g., providing an indication for objects to be further processed by a second, more computationally intensive model). Accordingly, the audio event may be taken into account in operations (e.g., simulations, estimated states, interaction modeling, collision estimation, etc.) or other vehicle control planning operation.

The classification values output by the model may also or instead be used by a vehicle computing device to determine an error associated with a sensor. For instance, based on a difference in a first classification value associated with a first sensor and the second classification value associated with a second sensor, the computing device may determine that the first sensor or the second sensor needs calibration. For instance, comparing the difference in the classification values to one or more threshold values may indicate that one of the sensors may be a false positive (e.g., incorrectly identifying a siren), a false negative, and so on. By using classification values from the model to identify a sensor error (e.g., a sensor drift, a sensor bias), the vehicle computing device may improve accuracy of sensor measurements from a sensor of the vehicle.

In some examples, the classification values output by the machine learned model may be used by a vehicle computing device to improve a sensor different from the sensor detecting the audio event (e.g., provide information to direct another sensor where to 'look' in the environment). For instance, functionality associated with an image sensor or a lidar sensor, just to name a few, can be improved to perform different detection techniques in an area associated with the audio event. In some examples, the vehicle computing device may determine a different level of perception in a region in which the model outputs a high confidence that at least one sensor heard a sound of interest (as indicated by the associated classification values). For instance, if there is a high confidence that a sensor detected a siren of an emergency vehicle based on a classification value output from the model, then a perception component of the vehicle can be modified to focus one or more sensors in an area of the source of the siren (e.g., as determined by a direction of arrival). As another non-limiting example, the vehicle computing device may determine a different level of perception such as initiating perception for reverse lights of a vehicle emitting a beeping sound to indicate that it is backing up. By heightening perception based on the classification values, the vehicle can more safely navigate in an environment compared to not implementing the model.

In some examples, a vehicle may receive audio data captured via audio sensors (e.g., pairs of audio sensors) of the vehicle. The audio data may be received from the audio sensors as signals associated with objects (e.g., original sources of sounds and/or objects from which sound is reflected). For example, first audio data may be captured via sensors as first sound associated with a first object, second audio data may be captured via sensors as second sound associated with a second object, and third audio data may be captured via sensors as third sound associated with a third object, and so on. The first object, the second object, and the third object may each be a different object from one another, or a same object as one or more of the other objects (e.g., the first object may be ultimately a same object as the second object, and a different object from the third object). In some examples, the first audio data may be captured via a first pair of audio sensors as first sound associated with a first object, the second audio data may be captured via a second pair of audio sensors as second sound associated with a second object, and the third audio data may be captured via a third pair of audio sensors as third sound associated with a third object, and so on.

In some examples, audio sensor pairs may be disposed on a front area, a back area, a left side and a right side of the vehicle (e.g., where the "front" is relative to a direction of travel) to cover all directions around the vehicle. Each of the audio sensor pairs can cover an area of 180-degrees of angle. For example, the audio sensor pair disposed on the front area of the vehicle can cover the front area in the 180-degrees of angle, the audio sensor pair disposed in the back area of the vehicle can cover the back area in the 180-degree of angle, the audio sensor pair disposed on the left side of the vehicle can cover the left side in the 180-degree of angle, and the audio pair disposed on the right side of the vehicle can cover the right side in the 180-degree of angle. Thus, four audio sensor pairs can cover all directions surrounding the vehicle.

In some examples, a vehicle may receive audio data via audio sensors (e.g., a pair of audio sensors) as a direct signal (e.g., a sound originating from a source without any reflections— a direct sound) associated with an object (e.g., a source of the sound) or as a reflected signal (e.g., a reflected sound) whereby the sound is generated by the object and reflected off of an object in the environment prior to being captured by audio sensors of the vehicle. In some examples, reflected sound may be received with or without direct sound.

The techniques discussed herein can improve a functioning of a computing device of a vehicle in a number of ways. As the audio sensors of the vehicle can capture the sound generated by sirens before other sensors, such as image sensors(s), lidar sensor(s), and radar sensor(s), utilizing the audio data can improve a capability of the vehicle to respond to an emergency. For example, the model may act as an attention system (e.g., as a redundant system to an existing perception component) that identifies sounds for further processing by a vehicle computing device and/or otherwise uses fewer computational resources to determine a direction of arrival or source of a sound than other, more resource intensive, processes. Utilizing classification values by a perception component of the vehicle computing device, for instance, can improve the accuracy and/or reduce a latency for the vehicle to respond to the emergency in the environment.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using audio data. Further, although discussed in the context of emergency vehicle(s) or sounds associated with such emergency vehicle(s), the techniques can be applicable to any type or category of sound and are not limited to specific examples discussed herein. Additionally, the techniques described herein can be used with real data (e.g., captured using sensor(s)), simulated data (e.g., generated by a simulator), or any combination of the two.

FIG. 1 is an illustration of an autonomous vehicle (vehicle 102) in an environment 100, in which an example classification model (model component 104) may determine one or more classification values (classification value(s) 106). A vehicle computing device (e.g., vehicle computing device 404) may implement the classification model of the vehicle 102. While described as a separate system, in some examples, classification techniques described herein may be implemented by other vehicle systems, components, and/or computing devices. For example, and as will be described in further detail with regard to FIG. 4, the classification techniques described herein may be implemented at least partially by or in association with a localization component 420, a perception component 422, and/or a planning component 424.

In various examples, the vehicle computing device may be configured to receive sensor data representing audio of the environment 100, such as via a perception component (e.g., the perception component 422). In some examples, the vehicle computing device may detect, infer, estimate, or otherwise determine audio data representing sound in the environment 100. Sound may be received by the vehicle 102 as audio signals. In some examples, the sensor(s) may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 100. In various examples, the vehicle 102 may be configured to transmit and/or receive data from other autonomous vehicles. The data may include sensor data, such as audio data associated with the environment 100.

In some examples, the vehicle computing device may be configured to detect an object in the environment 100, such as object 108 (e.g., an emergency vehicle), object 110 (e.g., a pedestrian), object 112 (e.g., a construction zone), object 114 (e.g., thunder), and object 116 (e.g., a building).

In some examples, the vehicle computing device may be configured to receive, detect, infer, estimate, or otherwise determine first audio data representing sound 118 from the emergency vehicle 108, second audio data representing sound 120 from the pedestrian 110, third audio data representing sound 122 from the construction zone 112, fourth audio data representing sound 124 from the thunder 114, fifth audio data representing sound 126 from the building 116, as shown in FIG. 1. In some examples, any one of the sounds (118, 120, 122, 124, and/or 126) can be distinguished from being a direct sound or a reflected sound. For instance, the sound 118 associated with the emergency vehicle 108 may be captured by the vehicle 102 independent of whether the sound 118 is directly received by the vehicle 102 or whether the sound is reflected off another object, such as building 116.

The sound 118 may comprise a siren sound emitted by the emergency vehicle 108 in varying frequency and/or sound intensity. An audio event classifier of the model component 104 may be configured to identify whether the sound 118 corresponds to a class of the audio event classifier. For instance, the model component 104 may determine that the sound 118 is a siren from an emergency vehicle 108, and output a classification value representing a likelihood that a microphone or other sensor of the vehicle 102 detected a siren in the sound 118.

Figure 2:
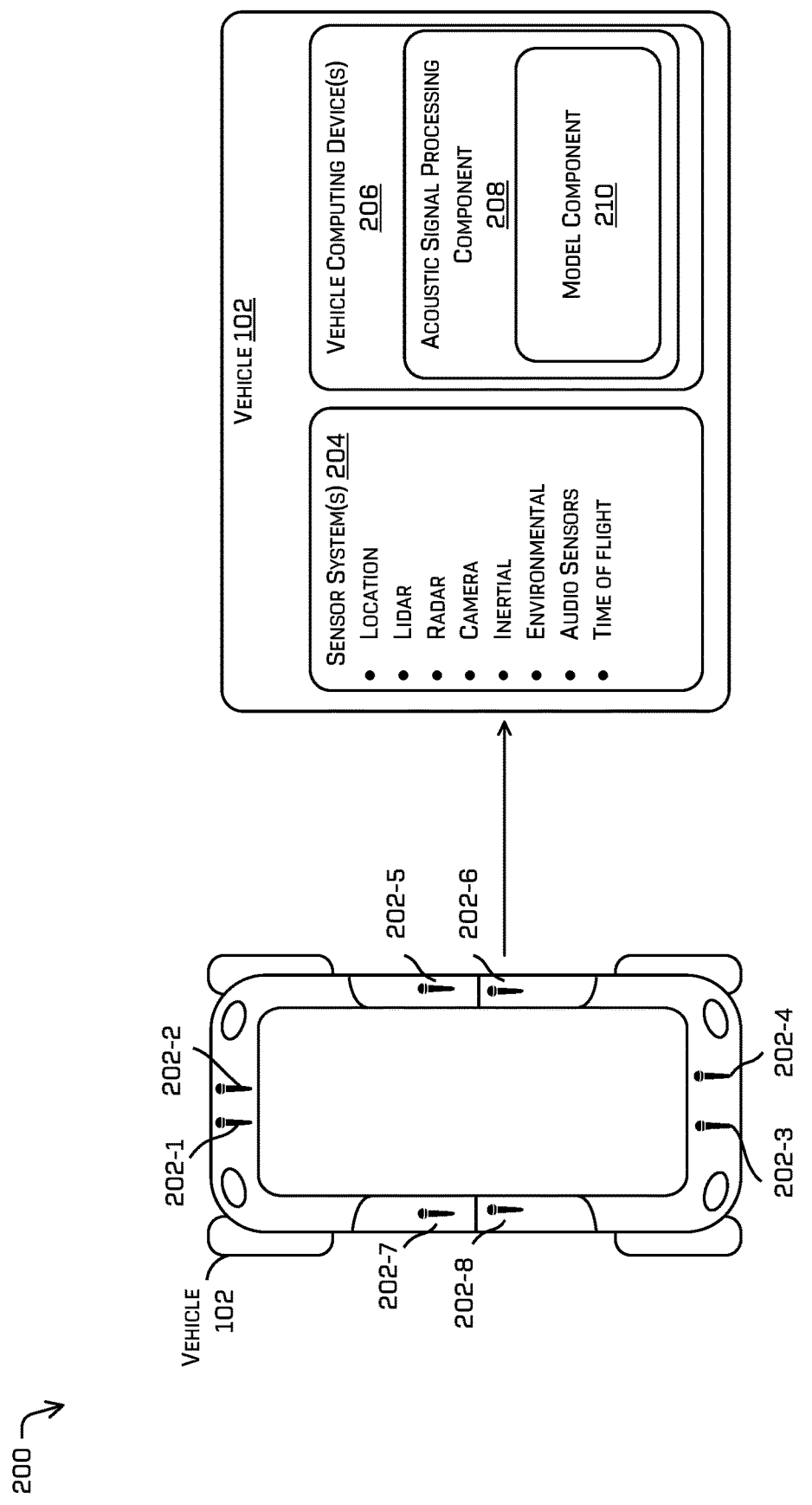
FIG. 2 is a block diagram of an example sensor system for implementing the techniques described herein.

In some examples, and as discussed further in FIG. 2 and elsewhere, any one of the sounds (118, 120, 122, 124, and/or 126) may be captured from one or more sensors. For instance, a first microphone may capture first audio data associated with the sound 118 and a second microphone may capture second audio data associated with the sound 118. The model component 104 may output a first classification value indicating a probability of the first sensor classifying the sound 118, and output a second classification value indicating a probability of the second sensor classifying the sound 118. Additional detail for determining and utilizing classification values are discussed throughout this disclosure.

The sound 120 associated with the pedestrian 110 may represent screaming, shouting, or other human sound that varies in frequency and/or intensity. Using the model component 104, the sound 120 may be classified as an emergency audio event based at least in part on an audio event classifier identifying the screaming or shouting as an emergency (based on the intensity and/or frequency of the sound 120 in comparison to an audio event classifier associated with human sounds correlated to emergencies, for example).

The sound 122 associated with the construction zone 112 may represent construction noise such as a power tool or a collective sound of the construction area. The sound 124 associated with the thunder 114 may represent thunder sounds in varying type, and multiple audio event classifiers may be associated with each varying type of thunder sound (and similar for other types of sounds). The sound 126 associated with the building 116 may represent sounds originating from the building 116 and/or sounds reflected off the building 116. For instance, the sound 126 may comprise music emitted from the building 116 which, despite having a relatively high volume may be classified as a non-emergency event by the model component 104.

In some examples, the model component 104 may output a classification of whether the sound 118, the sound 120, the sound 122, the sound 124, and/or the sound 126 is an emergency audio event or a non-emergency audio event. For instance, the model component 104 may implement one or more audio event classifiers to classify each audio event associated with respective audio data. That is, the model component 104 may apply a same and/or a different audio event classifier to the first audio data associated with the sound 118, the second audio data associated with the sound 120, and so on. In some examples, the model component 104 may apply a same audio event classifier to audio data from two or more different audio sensors. In this way, classification values from the model component 104 may be processed and compared in various ways, further discussion of which can be found herein.

In some examples, a classification value associated with a first sensor may be used by a model to determine a first direction of arrival for a sound, and another classification value associated with a second sensor may be used by the model to determine a second direction of arrival for a sound. In such an example, the first direction of arrival and the second direction of arrival for the sound may be compared by the model to an output of a third sensor, such as a camera or additional microphone, to provide additional data usable by the model to determine if an object producing the sound is closer to the first direction of arrival or the second direction of arrival (e.g., another sensor modality can be used to validate one or both of the classification values). For instance, the model may output classification values associated with two different microphones indicating that an audio event may be a fire truck siren. If the probabilities that each microphone heard the fire truck siren have a difference that meets or is greater than a threshold, then a computing device may receive sensor data from the third sensor usable to verify or otherwise validate whether one of the two microphones is more accurate. In such an example, a first direction of arrival and a second direction of arrival determined for one or more sounds may be input into a model (or otherwise compared, e.g., using normalized cross correlations) to determine whether sound associated with each direction of travel is associated with a same source (e.g., a police vehicle) and/or different sources (e.g., the first direction of arrival is associated with a fire truck and the second direction of arrival is associated with an ambulance or a second fire truck). Models can use the audio information from the model component 104 to determine one or more sources of the sound to initiate different levels of computational processing (e.g., additional processing and/or lower levels of processing) for different objects.

In various examples, a classification value output from the model component 104 may be used to refine, update, estimate, or otherwise determine a threshold associated with a sensor. For example, a sensor associated with vision detection may have a threshold (e.g., 70% certainty) for determining that a vehicle is an emergency vehicle, and a vehicle computing device may, based at least in part on receiving the classification value indicating a high likelihood of hearing a siren, determine that the threshold for the sensor should be lowered (e.g., to 50% certainty) because we're not as worried about false positives given the indication of the siren from the model. In some examples, a computing device may determine and/or receive a direction of arrival for the sound based on the classification value, and determine the threshold for the sensor further based at least in part on the direction of arrival. For instance, the threshold for a vision detector may be updated based on the direction of travel and the classification value from the model.

Based on determining that the audio event occurred, the classification values output by the model component 104 may be used by a vehicle computing device to determine a direction of arrival (DoA) of the audio event relative to the vehicle 102. In various examples, the vehicle computing device may receive pose data (e.g., orientation data and/or position data) associated with at least one audio sensor and determine the direction of arrival associated with the audio event based at least in part on a classification value and the pose data associated with the sensor. Additional details for determining a direction of arrival are discussed throughout this disclosure including in FIG. 3.

In some examples, the vehicle computing device may determine an action for the vehicle 102 based at least in part on one or more classification values. For instance, the model component 104 may provide functionality of an attention system for the vehicle 102 by identifying sounds of interest and communicating classification information about the identified sounds to other components of the vehicle computing device. Accordingly, the audio event may be taken into account in operations (e.g., simulations, estimated states, interaction modeling, collision estimation, etc.) or other vehicle control operations.

The classification values output by the model component 104 may also or instead be used by a vehicle computing device to determine and/or identify an error associated with a sensor. For instance, based on a difference in a first classification value associated with a first sensor and the second classification value associated with a second sensor, the computing device may determine that the first sensor or the second sensor needs calibration. In various examples, comparing the difference in the classification values to one or more threshold values may indicate that one of the sensors may be a false positive (e.g., incorrectly identifying a siren). Thus, by using classification values from the model component 104, the vehicle computing device may improve accuracy of sensor measurements from a sensor of the vehicle 102.

FIG. 2 is a block diagram of an example sensor system for implementing the techniques described herein. As illustrated in FIG. 2, the vehicle 102 may include one or more audio sensors (e.g., 202-1, 202-2, 202-3, 202-4, 202-5, 202-6, 202-7, and 202-8) that generate audio data representing sound in an environment where the vehicle 102 is located.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle 102 at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, the vehicle 102 can include sensor system(s) 204 disposed on the vehicle 102. The sensor system(s) 204 can include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, audio sensors (e.g., audio sensors 202-1, 202-2, 202-3, 202-4, 202-5, 202-6, 202-7, and 202-8), environment sensors (e.g., temperature sensors, humidity sensors, light sensors, pressure sensors, etc.), etc. The sensor system(s) 204 can generate sensor data, which can be utilized by vehicle computing device 206 (also referred to as a vehicle computing device 206 or vehicle computing device(s) 206) associated with the vehicle 102.

In at least one example, the vehicle computing device(s) 206 may determine a direction of arrival (DoA) of an audio source in the environment based at least in part on audio data received from the sensor system(s) 204 associated with the vehicle 102. The audio data, i.e., the raw audio data, from the audio source(s) in the environment of the vehicle 102 may be collected, captured, received, or otherwise determined by the audio sensor(s) 202-1, 202-2, 202-3, 202-4, 202-5, 202-6, 202-7, and 202-8. The raw audio data or the raw data may refer to audio data or data captured by the audio sensors that may be uncompressed. Alternatively, the raw audio data and the raw data may refer to audio data or data captured by the audio sensors that may be compressed but that otherwise remain unprocessed. As illustrated in FIG. 2, audio sensor pair [202-1, 202-2] are disposed on a front area of the vehicle 102, audio sensor pair [202-3, 202-4] are disposed on a back area of the vehicle 102, audio sensor pair [202-5, 202-6] are disposed on a right side of the vehicle 102, and audio sensor pair [202-7, 202-8] are disposed on a left side of the vehicle 102. The front area, the back area, the left side and the right side are with respect to a direction of driving of the vehicle 102. Each of the audio sensor pairs can cover an area of 180-degree of angle, although audio sensors may be associated with any coverage range. In some examples, the audio sensor pair [202-1, 202-2] can cover the front area of the vehicle 102 in the 180-degree of angle, the audio sensor pair [202-3, 202-4] can cover the back area of the vehicle 102 in the 180-degree of angle, the audio sensor pair [202-5, 202-6] can cover the right side of the vehicle 102 in the 180-degree of angle, and the audio pair [202-7, 202-8] can cover the left side of the vehicle 102 in the 180-degree of angle. Thus, the audio sensors illustrated in FIG. 2 can cover all directions surrounding the vehicle 102, i.e., 360-degree of angle.

It should be understood that the audio sensors in FIG. 2 are for the purpose of illustration. A different number of audio sensors may be disposed on the vehicle 102. The positions of those audio sensors being disposed on the vehicle may vary. The forming of audio sensor pairs or the forming of a set of audio sensors comprising more than two audio sensors may be determined in accordance with a size and/or the computing capacity of the vehicle computing device(s) 206.

In some examples, the computing device(s) 206 of the vehicle 102 may include an acoustic signal processing component 208 that processes the audio data or audio signal representing the sound in an environment. The acoustic signal processing component 208 may include one or more models including a model component 210. In some examples, the acoustic signal processing component 208 may comprise the model 210 and another model configured to determine a direction of arrival and/or to determine whether a sound is a reflected sound. For instance, the model component 210 may be redundant and/or implemented in parallel with one or more other models such as a Direction of Arrival (DoA) detection component (not shown). Examples of a DoA detection component are provided in U.S. patent application Ser. No. 16/836,605, titled "Distinguishing Between Direct Sounds and Reflected Sounds in an Environment," filed Mar. 31, 2020, the entirety of which is herein incorporated by reference.

In some examples, the acoustic signal processing component 208 can provide functionality to "pre-process" the audio data prior to it being entered into the model component 210. For example, the acoustic signal processing component 208 can be configured to identify frequency information and/or intensity information associated with the audio data.

In some examples, the model component 210 may provide at least the functionality described in relation to the model component 104. The model component 210 may receive the audio data representing sound from the environment from the audio sensor(s) 202-1, 202-2, 202-3, 202-4, 202-5, 202-6, 202-7, and 202-8, and output classification values for respective audio data associated with each respective audio sensor(s).

In some examples, the model component 210 may identify, detect, analyze, or otherwise determine an intensity and/or a frequency of sound associated with first audio data and second audio data. In some examples, the model component 210 may determine a first classification value based at least in part on the intensity and/or the frequency of sound associated with the first audio data and may also or instead determine a second classification value based at least in part on the intensity and/or the frequency of sound associated with the second audio data In various examples, the model component 210 may send information associated with the first classification value and the second classification value to the vehicle computing device 206 of the vehicle 102. The information associated with the first classification value may comprise one or more of: information indicative of a likelihood that the first audio data is associated with one or more classifications implemented by the model component 210 (e.g., an audio event classifier), information representing an audio event type (e.g., an emergency audio event or a non-emergency audio event), frequency information, sound intensity information, etc.). The information associated with the second classification value may comprise one or more of: information indicative of a likelihood that the second audio data is associated with the one or more classifications implemented by the model component 210 (e.g., an audio event classifier), information representing an audio event type (e.g., an emergency event or an non-emergency event), frequency information, sound intensity information, etc.).

In some examples, the model component 210 may determine that sound corresponds to a class of the audio event classifier based at least in part on attributes of the sound. In various examples, frequency information associated with the classification value(s) 304 output from the model component 210 may be compared to frequency information typically generated by different sirens to adjust a level of confidence that the sound corresponds to the class.

The vehicle computing device 206 may, based at least in part on the information received from the model component 210, determine a direction of arrival of an audio event relative to one or more of the sensor systems 204 and/or control the vehicle 102. For instance, controlling the vehicle 102 may comprise controlling at least one of: a braking system, an acceleration system, or a drive system of the vehicle (e.g., vehicle 402). In some examples, controlling the vehicle 102 by the vehicle computing device 206 may comprise controlling the vehicle based at least in part on the direction of arrival of the audio event.

In some examples, vehicle computing device 206 may determine, based at least in part on the information received from the model component 210, a direction of a source of the audio event relative to the vehicle (or a sensor of the vehicle), and optionally control the vehicle based at least in part on the direction associated with the source of the audio event.

In some examples, a category of the emergency (or non-emergency) may be determined based at least in part from an audio event classifier. The audio event classifier may be a pre-trained component to determine categories of events. The training of the audio event classifier may be based at least in part on historical data associated with past events which occurred in the environment of the vehicle 102 and features/parameters that were used to identify the past events. The features/parameters that were used to identify the past events may be determined based at least in part on the audio data, video data, lidar data, radar data, etc. captured by the vehicle 102. For emergency vehicles, the audio event classifier may be trained using past emergency vehicles and features that were used to identify those past emergency vehicles and associated with audio data (or other data) representing the siren of the emergency vehicles. The audio event classifier may be periodically trained using the feedback from identified emergencies in real-time.

In some examples, the classification of the audio event may include an emergency audio event class comprising an ambulance siren class, a police siren class, a fire truck siren class, etc., or a non-emergency audio event class comprising an engine sound class, a music sound class, a thundering sound class, a speech sound class (e.g., including subclasses for shouting, hollering, etc.), a power tool sound class, a reverse direction sound class, a honking sound class, just to name a few. For example, an input to the model 104 can include an input vector, a Fourier vector, etc. associated with a time period (e.g., 1 second, 2 seconds, and so on). An example output may comprise a softmax classifier than outputs one or more classifications.

In some examples, a sensor of the vehicle 102 can be calibrated based at least in part on one or more classification values from the model 104. For example, the one or more classification values can be associated with a source of sound (e.g., an object) via a perception system, for example. If a confidence level of the sound classification meets or exceeds a threshold value, the one or more classification values associated with the sound classification can be used to determine a direction of arrival, for example. For instance, a confidence value may be between zero and one with a value closer to one indicating a higher confidence level that the sound classification by the model 104 is accurate. In some examples, the confidence value may vary in accordance with a change in distance from a sensor of the vehicle receiving the audio data and a source of the audio data (e.g., a higher confidence value may be associated with the audio data as the source of the audio data gets closer to the sensor).

Figure 3:
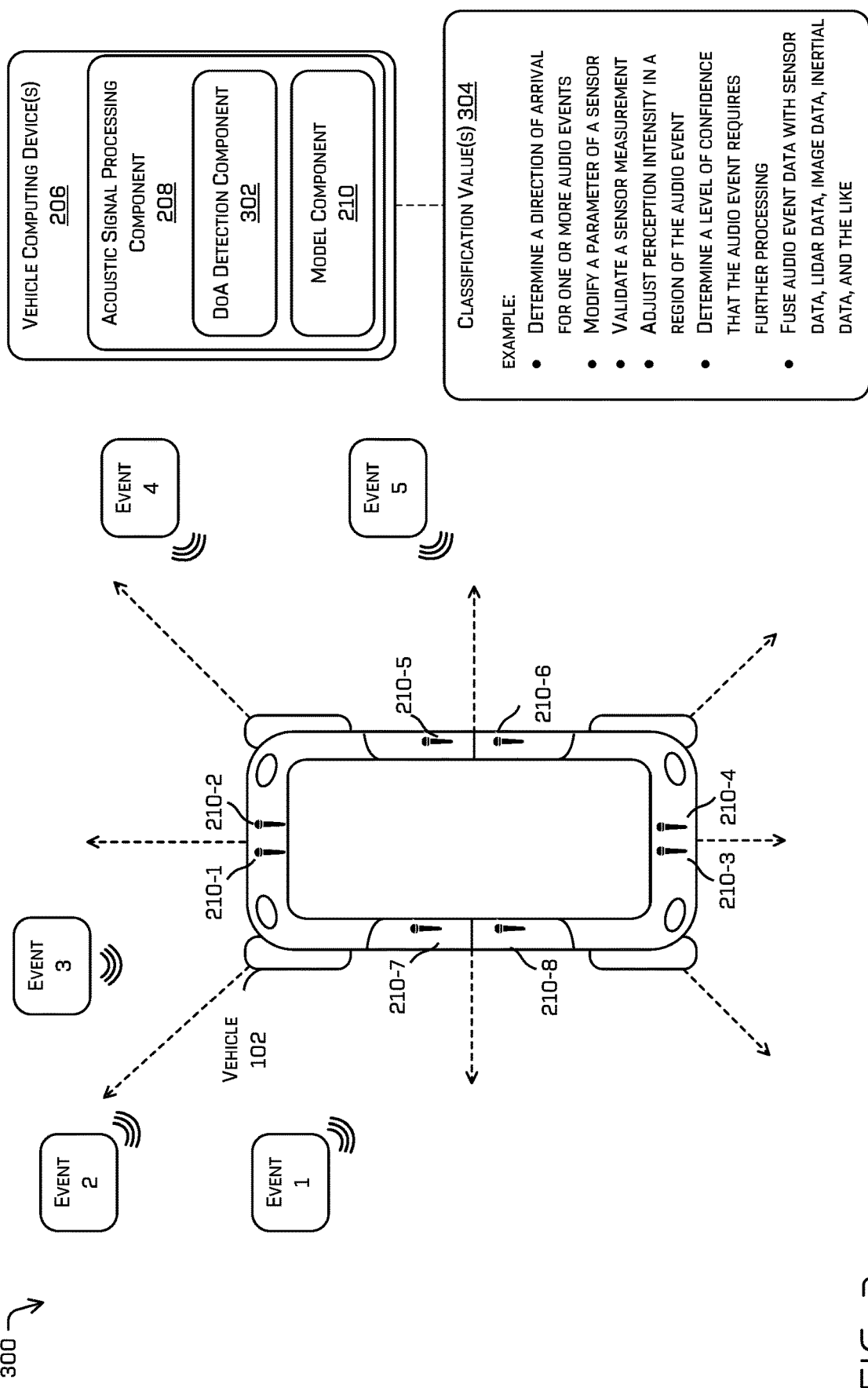
FIG. 3 is a pictorial diagram illustrating an example implementation to determine a direction of a sound in an environment of a vehicle based on a classification value from an example model.

FIG. 3 is a pictorial diagram illustrating an example implementation to determine a direction of a sound in an environment of a vehicle (vehicle 102).

As illustrated in FIG. 3, any one or more of the audio sensor(s) 202-1, 202-2, 202-3, 202-4, 202-5, 202-6, 202-7, and 202-8 may send audio data associated with an audio event, such as Event 1, Event 2, Event 3, Event 4, and/or Event 5 (also collectively referred to as "the Events"), which may occur in the environment of vehicle 102. The audio event may represent siren signals (or other sounds) generated from their respective directions and associated with respective audio data.

In some examples, audio sensor pairs may be formed to determine the direction of an Event: pair [210-1, 210-2], [210-7, 210-8], [210-5, 210-6], [210-3, 210-4], [210-1, 210-7], [210-1, 210-6], [210-6, 210-4], and [210-4, 210-7], though other combination of sensor pairs are contemplated.

In some examples, a direction of arrival (DoA) detection component 302 of the vehicle computing device 206 may determine an approximate direction of the siren signals (or other audio signals classified as an emergency event) based at least in part on one or more of the classification value(s) 304 from model component 210 of vehicle 102. By way of example and not limitation, a first classification value associated with sensor 210-1 may indicate that Event 2 has a 90% likelihood of being a siren of an emergency vehicle and a second classification value associated with sensor 210-7 may indicate that Event 2 has a 70% likelihood of being a siren of an emergency vehicle. Accordingly, the DoA detection component 302 may receive, as input, the first classification value, the second classification value, and pose data of the sensor 210-1 and/or pose data of the sensor 210-7 to determine the approximate direction of Event 2 relative to the sensor 210-1 and/or the sensor 210-7.

The DoA detection component 302 may be representative of a machine learned model that is configured to determine the DoA in various ways. For example, the DoA detection component 302 may receive audio data, sensor data, and the like, and simultaneously generate multiple directions of arrival for a single object, or for multiple objects. In some examples, a single model may determine classification values and a direction of arrival for one or more objects while in other examples, a first model may determine classification values while a second model determines the direction of arrival.

In some examples, the DoA detection component 302 (or other component of the vehicle computing device 206) may determine a direction of arrival for any one or more of the Events responsive to determining that a classification value meets or exceeds a predetermined value. For instance, based on a classification value indicating that the probability of the classification value is equal to or greater than a threshold, the DoA may be determined based at least in part on the classification value.

In some examples, the DoA detection component 302 (or another component of the vehicle computing device 206) may determine a direction of arrival based at least in part on at least one of: a magnitude difference between first audio data of a first audio sensor and second audio data of a second audio sensor or a time difference between the first audio data and the second audio data. In various examples, the magnitude difference may be representative of a difference in sound intensity, frequency, etc. between the first audio data of the first audio sensor and the second audio data of the second audio sensor. The DoA detection component 302 may also or instead determine a direction of arrival based at least in part on a difference between a first time of arrival of the first audio data from the first audio sensor and a second time of arrival of the second audio data from the second audio sensor. In some examples, the first audio sensor and/or the second audio sensor may comprise an audio sensor pair.

In some examples, the DoA detection component 302 (or another component of the vehicle computing device 206) may determine a direction of arrival based at least in part on a set of values associated with a particular layer of a neural network. For instance, a neural network having multiple layers (e.g., representing different microphones or microphone pairs) may determine classification values based at least in part on an output from one of the layers. In this way, a layer of the neural network (e.g., an intermediate layer) can generate an output that is further processed by additional layers of the neural network to determine the classification values usable by the DoA detection component 302.

In various examples, determining an occurrence of one or more audio events may be based at least in part on a first direction of arrival associated with the first audio sensor and a second direction of arrival associated with the second audio sensor.

The vehicle computing device 206 may implement the DoA detection component 302 (or other component or algorithm), to determine a geometry associated with the environment at a time corresponding to one or more of Event 1, Event 2, Event 3, Event 4, and Event 5. The geometry associated with the environment at the time may be determined based on a distance between the location of the Event (e.g., a siren of an emergency vehicle) and the location of one or more of the audio sensors of the vehicle 102.

In some examples, the DoA detection component 302 may classify an audio event based at least in part on integrating the audio data with sensor data from (e.g., from perception component 422, as discussed herein). For example, image data can be captured and processed to determine a presence of flashing lights in the environment associated with a vehicle. A DoA value associated with an audio event may be associated with a first direction relative to the vehicle in the environment. If the image data indicates that a flashing light (e.g., indicative of an emergency vehicle) is located with the first direction, the DoA detection component 302 may increase a confidence value that the audio event is associated with an emergency event. In some examples, the color of the flashing lights may be determined to assist classifying the emergency class. For example, if the flashing lights are determined to be all red, the emergency class may be related to a firetruck. In another example, if the flashing lights are determined to be red and blue, the emergency class may be related to a police car. It should be understood that other perception pipelines may be also integrated with the audio data to determine the occurrence of the emergency vehicle. For example, lidar sensor data may be received and input to a machine learned model trained to determine a presence of an emergency vehicle in an environment. Examples of determining lighting states of an object are provided in U.S. patent application Ser. No. 15/982,658, titled "Vehicle Lighting State Determination," filed May 17, 2018, the entirety of which is herein incorporated by reference.

As illustrated in FIG. 3, the classification value(s) 304 have a variety of example uses by a computing device including one or more of: determining a direction of arrival for one or more audio events (e.g., Event 1, Event 2, Event 3, Event 4, and/or Event 5), modifying a parameter of a sensor (one or more of the audio sensor(s) 202-1, 202-2, 202-3, 202-4, 202-5, 202-6, 202-7, and 202-8), validating a sensor measurement, adjusting a level of perception (e.g., perception intensity) in a region of the audio event, determining a level of confidence that the audio event requires further processing, and fusing audio event data with sensor data, lidar data, image data, inertial data, and the like. For instance, a parameter of a sensor of the vehicle may be updated to change a level of perception associated with a sensor, calibrate the sensor, and/or identify an error associated with the sensor. In various examples, a sensor measurement from a sensor of the vehicle 102 may be validated for use in downstream processes based at least in part on comparing a classification value to a minimum threshold value (e.g., the sensor measurement may be used when the classification value indicates a high confidence in classification of a sound). In some examples, a perception component (e.g., perception component 422) may adjust a level of perception (e.g., an amount of computational power used to sense a region or the environment). Additionally or alternatively, the computing device may combine audio event data with sensor data, lidar data, image data, map data, and/or inertial data, to generate fused data available to the computing device for processing (e.g., to guide or control the vehicle, generate an alert of the emergency event to another vehicle).

In some examples, the vehicle computing device 206 (or a remote computing device) can process output(s) from the model component 210 to generate a map showing the audio event relative to one or more vehicles in the environment. For instance, a remote teleoperation center may receive outputs from the model component 210 and generate or update a three dimensional map usable by a fleet of autonomous vehicles to navigate in the environment.

Figure 4:
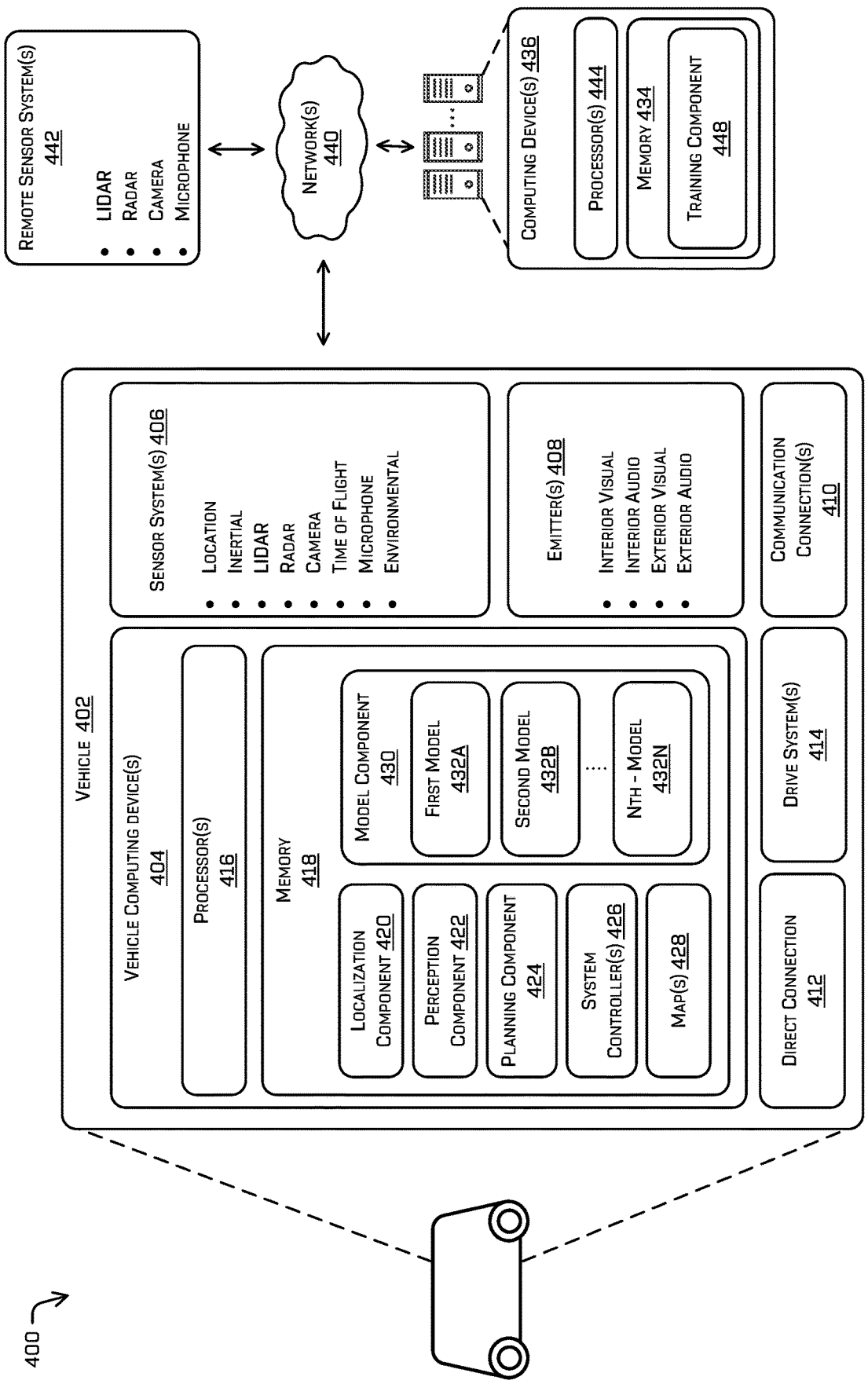
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device 404 (also referred to as a vehicle computing device 404 or vehicle computing device(s) 404), one or more sensor systems 406, one or more emitters 408, one or more communication connections 410, at least one direct connection 412, and one or more drive systems 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device 404 stores a localization component 420, a perception component 422, a planning component 424, one or more system controllers 426, one or more maps 428, and a model component 430 including one or more models, such as a first model 432A, a second model 432B, up to an Nth model 432N (collectively "models 432"), where N can be any integer greater than 1. Though depicted in FIG. 4 as residing in the memory 418 for illustrative purposes, it is contemplated that the localization component 420, the perception component 422, the planning component 424, the one or more system controllers 426, the one or more maps 428, and/or the model component 430 including the models 432 may additionally, or alternatively, be accessible to the vehicle 402 (e.g., stored on, or otherwise accessible by, memory remote from the vehicle 402, such as, for example, on memory 434 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 428 and/or map component 428, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 402. In some examples, a prediction component may measure a trace of an object and generate a trajectory for the object based on observed and predicted behavior.

In at least one example, the vehicle computing device 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 428. That is, the map(s) 428 may be used in connection with the localization component 420, the perception component 422, and/or the planning component 424 to determine a location of the vehicle 402, detect or determine gravity, detect objects in an environment, generate routes, determine actions and/or trajectories to navigate within an environment.

In some examples, the one or more maps 428 may be stored on a remote computing device(s) (such as the computing device(s) 436) accessible via network(s) 440. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As illustrated in FIG. 4, the vehicle computing device 404 may include a model component 430. The model component 430 may be configured to determine classification values for an audio event in an environment of the vehicle 402. In various examples, the model component 430 may receive audio data associated with an object from the localization component 420, the perception component 422, and/or from the sensor system(s) 406. In some examples, the model component 430 may receive map data from the localization component 420, the perception component 422, the maps 428, and/or the sensor system(s) 406. While shown separately in FIG. 4, the model component 430 could be part of the localization component 420, the perception component 422, the planning component 424, or other component(s) of the vehicle 402.

In various examples, the model component 430 may send output(s) from the first model 432A, the second model 432B, and/or the Nth model 432N that are used by the perception component 422 to alter or modify an amount of perception performed in an areas of the audio event. In some examples, the planning component 424 may determine one or more actions (e.g., reference actions and/or sub-actions) for the vehicle 402 based at least in part on output(s) from the model component 430. In some examples, the model component 430 may be configured to output information indicating a confidence level of a classification matching an associated audio event classifier. In some examples, the model component 430 may include at least the functionality provided by the model component 210 of FIG. 2.

In some examples, the model component 430 may communicate an output to the perception component 422 to cause an update to one or more parameters (e.g., bias values, drift values, and the like) associated with the sensor system(s) 406. In some examples, object(s) in the environment may be identified for further processing based at least in part on probabilities provided by the model component 430. For instance, the vehicle computing device(s) 404 may modify the one or more parameters that control a threshold of operation for one or more of the sensor systems(s) 442 and/or perception models. In this way, sensor(s) that can detect the object(s) may employ heighted levels of detection (e.g., increased level of computation resources) to the objects identified for further processing. By outputting an indication of which objects to process further, the model component 430 enables other components of the vehicle computing device(s) 404 to use more or fewer computational resources resulting in more efficient use of available resources.

In various examples, the model component 430 may utilize machine learning techniques to determine a classification value, as described with respect to FIG. 1 and elsewhere. In such examples, machine learning algorithms (e.g., a siren detector algorithm) may be trained to classify an audio event while improving accuracy of the classification.

As can be understood, the components discussed herein (e.g., the localization component 420, the perception component 422, the planning component 424, the one or more system controllers 426, the one or more maps 428, the model component 430 including the models 432 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 418 (and the memory 434, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 440, to the one or more computing device(s) 436 at a particular frequency, after a lapse of a predetermined period of time, in near real-time, etc. In some examples, the model component 430 may receive sensor data from one or more of the sensor system(s) 406.

The vehicle 402 may also include one or more emitters 408 for emitting light and/or sound. The emitters 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 442 for receiving sensor data. The communication connection(s) 410 also enable the vehicle 402 to communicate with a remote teleoperations computing device or other remote services.

The communication connection(s) 410 may include physical and/or logical interfaces for connecting the vehicle computing device 404 to another computing device or a network, such as network(s) 440. For example, the communication connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, the one or more maps 428, and the model component 430, may process sensor data, as described above, and may send their respective outputs, over the one or more network(s) 440, to the computing device(s) 436. In at least one example, the localization component 420, the perception component 422, the planning component 424, the one or more system controllers 426, the one or more maps 428, and the model component 430 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 440. In some examples, the vehicle 402 may receive sensor data from the computing device(s) 436 and/or remote sensor system(s) 442 via the network(s) 440. The sensor data may include raw sensor data and/or processed sensor data and/or representations of sensor data. In some examples, the sensor data (raw or processed) may be sent and/or received as one or more log files.

The computing device(s) 436 may include processor(s) 444 and a memory 434 storing a training component 448.

In some instances, the training component 448 can include functionality to train a machine learning model to output classification values. For example, the training component 448 can receive data that represents labelled audio data of various sounds (e.g. publicly available data, data labeled by a human, data labeled by a machine learned model, microphone data, and/or a combination thereof). At least a portion of the data can be used as an input to train the machine learning model. As a non-limiting example, sensor data, audio data, image data, map data, inertia data, vehicle state data, historical data (log data), or a combination thereof may be input into the machine learned model. In some examples, the training data can comprise publicly available labeled data (e.g., an image or video depicting a sound of a particular class) that is above a certain confidence threshold to have a sound of interest (e.g., chance of having a siren is greater than 10% or some other value). Thus, by providing data where the vehicle traverses an environment, the training component 448 can be trained to output classification values associated with audio data, as discussed herein.

In some examples, the training component 448 can be trained to differentiate sounds to be classified from background noise. For example, training data with various background noises may be used during training to improve classification despite different types of background noise.

In some examples, the training component 448 can include training data that has been generated by a simulator. For example, simulated training data can represent examples where a vehicle collides with an object in an environment or nearly collides with an object in an environment, to provide additional training examples.

In some examples, functionality provided by the training component 448 may be included and/or performed by the vehicle computing device 404.

The processor(s) 416 of the vehicle 402 and the processor(s) 444 of the computing device(s) 436 may be any suitable processor capable of executing instructions to process data and perform operations as described herein. By way of example and not limitation, the processor(s) 416 and 444 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 434 are examples of non-transitory computer-readable media. The memory 418 and memory 434 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and memory 434 may include at least a working memory and a storage memory. For example, the working memory may be a high-speed memory of limited capacity (e.g., cache memory) that is used for storing data to be operated on by the processor(s) 416 and 444. In some instances, the memory 418 and memory 434 may include a storage memory that may be a lower-speed memory of relatively large capacity that is used for long-term storage of data. In some cases, the processor(s) 416 and 444 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa. For instance, either the vehicle 402 and/or the computing device(s) 436 may perform training operations relating to one or more of the models described herein.

Figure 5:
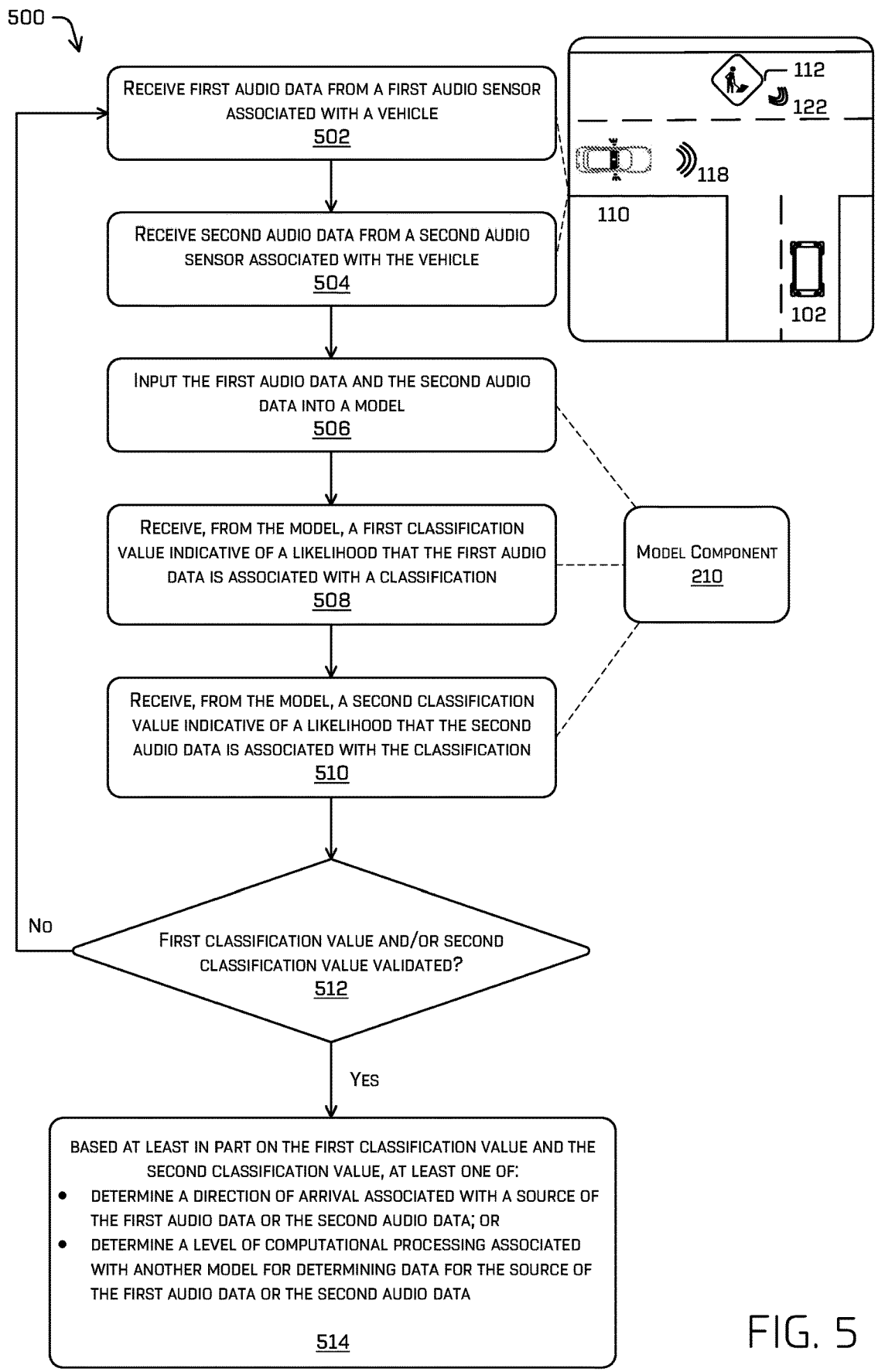
FIG. 5 is a flowchart depicting an example process for determining classification values using one or more example models.

FIG. 5 is a flowchart depicting an example process for determining classification values using one or more models. Some or all of the process 500 may be performed by one or more components in FIG. 2 or FIG. 4, as described herein. For example, some or all of process 500 may be performed by the vehicle computing device 206 and/or the vehicle computing device 404.

At operation 502, the process may include receiving first audio data from a first audio sensor associated with a vehicle. In some examples, the operation 502 may include capturing first audio data associated with sound 118 by an audio sensor, a first pair of audio sensors, multiple pairs of audio sensors, or a combination thereof, of the vehicle 102. The sound 118 can be associated with an emergency vehicle 108.

At operation 504, the process may include receiving second audio data from a second audio sensor associated with the vehicle. In some examples, the operation 504 may include capturing second audio data associated with sound 122 by an audio sensor, a same pair of audio sensors as the first pair of audio sensors, a second pair of audio sensors different from the first pair of audio sensors, multiple pairs of audio sensors, or a combination thereof, of the vehicle 102. The sound 122 can be associated with a construction zone 112.

At operation 506, the process may include inputting the first audio data and into a model. In some examples, the operation 506 may include inputting the first audio data associated with sound 118 and the second audio data associated with sound 122 into the model component 210.

At operation 508, the process may include receiving, from the model, a first classification value indicative of a likelihood that the first audio data is associated with a classification. In some examples, the operation 508 may include comparing information associated with the sound 118 (e.g., frequency and/or sound intensity information) to information associated with the classification (e.g., an audio event classifier) of the model component 210, and generating a classification value(s) (e.g., classification value(s)304) based at least in part on a result of the comparison. In some examples, the classification value may indicate a confidence that the model component 210 accurately classified the sound 118. For instance, the model component 210 may compare information associated with the sound 118 to information of an emergency sound class and a non-emergency sound class, and determine a level of confidence in the sound 118 being an emergency sound or a non-emergency sound based at least in part on the comparison of information.

At operation 510, the process may include receiving, from the model, a second classification value indicative of a likelihood that the second audio data is associated with the classification. In some examples, the operation 510 may include comparing information associated with the sound 122 (e.g., frequency and/or sound intensity information) to information associated with the classification (e.g., an audio event classifier) of the model component 210. In some examples, the first classification value and/or the second classification value may comprise one or more of: an emergency sound class, a non-emergency sound class, an engine sound class, a music sound class, a thundering sound class, an animal sound class, or a speech sound class. In various examples, the model component 210 may output a classification value for the sound 122 (and associated construction zone 112) to indicate whether the sound is an emergency, a non-emergency, an engine noise, music, thunder, an animal, or speech, and may further output an indication of the certainty of the classification.

At operation 512, the process may include determining whether the first classification value and/or the second classification value is valid. For instance, a vehicle computing device of the vehicle may compare the one or more classification values from the model component 210 to a threshold value. The operation 510 may be followed by the operation 502 if the first classification value and/or the second classification value is determined not to meet or exceed the threshold value (e.g., "no" in the operation 512). The operation 510 may continue to operation 514 if the second classification value and/or the second classification value is determined to meet or exceed the threshold value (e.g., "yes" in the operation 512).

At operation 514, the process may include, based at least in part on the first classification value and the second classification value, at least one of: determining a direction of arrival associated with a source of the first audio data or the second audio data; or determining a level of computational processing associated with another model for determining data for the source of the first audio data or the second audio data. In some examples, the operation 514 may include determining that the sound 118 associated with the emergency vehicle 108 (and/or the sound 122 associated with the construction zone 112) occurred based at least in part on a confidence indicated by the first classification value (or the second classification value).

In some examples, the operation 514 may include a vehicle computing device determining the direction of arrival (DoA) for a source of an audio event (e.g., an object emitting sound). For instance, the classification values 304 output by the model component 210 may be processed by a direction of arrival (DoA) component (e.g., DoA component 302) in a variety of ways discussed herein to determine the DoA of the sound.

In some examples, the operation 514 may include a vehicle computing device determining that an object or objects associated with different audio data may receive different levels of computation during subsequent processing (e.g., processing after the determination of the classification values may vary in accordance with the classification values. For example, an object may be associated with a person hollering in an environment, such as a pedestrian yelling at a vehicle (e.g., a relatively high classification value indicating 85% confidence in the yelling classification), and may receive more computational resources (e.g., processing and/or memory resources) when further processed by a component of the vehicle computing device as compared to another object in the environment that is associated with less certainty of the sound classification (e.g., a 60% confidence that beeping from a truck in reverse).

In some examples, the operation 514 may include controlling the vehicle 102 based on a direction of arrival of the sound 118 and/or a direction of arrival of the sound 122. For instance, the classification values output by the model component 210 may be used by a direction of arrival (DoA) component (e.g., DoA component 302). In some examples, the operation 514 may include determining a trajectory of the vehicle 102 based on the direction of arrival of the sound 118 and/or the sound 122. The vehicle 102 may be controlled to move according to (e.g., follow) the trajectory.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 502, 504, 506, 508, 510, and 514 may be performed without operation 512. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving first audio data from a first audio sensor associated with a vehicle; receiving second audio data from a second audio sensor associated with the vehicle; inputting the first audio data and the second audio data into a model; receiving, from the model, a first classification of the first audio data; receiving, from the model, a second classification of the second audio data; and based at least in part on the first classification and the second classification, at least one of: determining a direction of arrival associated with a source of the first audio data or the second audio data; or determining a level of computational processing associated with another model for determining data for the source of the first audio data or the second audio data.

B: A system as paragraph A describes, wherein the first classification comprises a first likelihood that the first audio data is associated with the first classification and the second classification comprises a second likelihood that the second audio data is associated with the second classification, and wherein the operations further comprise determining, based at least in part on a difference between the first classification and the second classification, the direction of arrival value associated with the first audio data or the second audio data.

C: A system as paragraphs A or B describe, the operations further comprising: receiving, as pose data, one or more of position data or orientation data associated the first audio sensor; and determining, based at least in part on the first likelihood, the second likelihood, and the pose data, the direction of arrival value associated with the source of the first audio data or the second audio data.

D: A system as paragraphs A-C describe, the operations further comprising: determining that the first audio data or the second audio data is associated with an emergency event; and determining an action to control the vehicle in an environment based at least in part on the direction of arrival value associated with the emergency event.

E: A system as paragraphs A-D describe, wherein the first classification or the second classification comprises one or more of: an emergency sound class, a non-emergency sound class, an engine sound class, a music sound class, a thundering sound class, an animal sound class, an ambulance siren sound class, a police siren sound class, a fire truck siren sound class, a power tool sound class, a reverse direction sound class, a honking sound class or a speech sound class.

F: A method comprising: receiving first audio data; receiving second audio data; inputting the first audio data and the second audio data into a model comprising one or more classifiers; receiving, from the model, a first likelihood that the first audio data is associated with a classification; receiving, from the model, a second likelihood that the second audio data is associated with the classification; and based at least in part on the first likelihood and the second likelihood, at least one of: determining a direction of arrival value associated with a source of the first audio data or the second audio data; or determining a level of computational processing associated with another model for determining data for the source of the first audio data or the second audio data.

G: A method as paragraph F describes, wherein the classification comprises one or more of: an emergency sound class, a non-emergency sound class, an engine sound class, a music sound class, a thundering sound class, an animal sound class, an ambulance siren sound class, a police siren sound class, a fire truck siren sound class, a power tool sound class, a reverse direction sound class, a honking sound class or a speech sound class.

H: A method as paragraphs F or G describe, further comprising: sending the first likelihood and the second likelihood to the other model; and causing the other model to determine a threshold associated with a sensor based at least in part on the first likelihood and the second likelihood.

I: A method as paragraphs F-H describe, wherein determining the level of computational processing comprises determining an amount of computational processing or memory capacity to allocate during subsequent processing of an object associated with the first audio data or the second audio data.

J: A method as paragraphs F-I describe, further comprising: determining an action to control a vehicle in an environment based at least in part on the direction of arrival value associated with the source of the first audio data or the second audio data.

K: A method as paragraphs F-J describe, wherein: the first audio data is associated with a first audio sensor, the second audio data is associated with a second audio sensor, and determining the direction of arrival value associated with the first audio data or the second audio data is further based at least in part on one or more of position data or orientation data associated with at least one of the first audio sensor or the second audio sensor.

L: A method as paragraphs F-K describe, wherein the direction of arrival value is a first direction of arrival value, the method further comprising: determining, based at least in part on at least one of: a magnitude difference between the first audio data and the second audio data or a time difference between the first audio data and the second audio data, a second direction of arrival value.

M: A method as paragraphs F-L describe, wherein: the first audio data is captured by a first audio sensor and a second audio sensor associated with a vehicle, and the second audio data is captured by a third audio sensor and a fourth audio sensor associated with the vehicle.

N: A method as paragraphs F-M describe, further comprising: determining that the first audio data or the second audio data are associated with an emergency event; and wherein controlling the vehicle comprises at least one of stopping the vehicle or determining a trajectory for the vehicle to follow in the environment.

O: A method as paragraphs F-N describe, further comprising: identifying an intensity or a frequency of sound associated with the first audio data and the second audio data; determining the first likelihood based at least in part on the intensity or the frequency of sound associated with the first audio data; and determining the second likelihood based at least in part on the intensity or the frequency of sound associated with the second audio data.

P: A method as paragraphs F-O describe, wherein the model is a first model and the direction of arrival value is a first direction of arrival value, further comprising: sending information associated with the first likelihood and the second likelihood to a second model; and receiving, from the second model, one or more of: a second direction of arrival value associated with the source of the first audio data or the second audio data; a probability that the first audio data and the second audio data are associated with a same classification; a probability that the first audio data and the second audio data are associated with a same object in an environment; or a probability that the first audio data is associated with a first object in an environment and the second audio data is associated with a second object in the environment.

Q: One or more non-transitory computer-readable media storing instructions executable by a processor, wherein the instructions, when executed, cause the processor to perform operations comprising: receiving first audio data; receiving second audio data; inputting the first audio data and the second audio data into a model comprising one or more classifiers; receiving, from the model, a first likelihood that the first audio data is associated with a classification; receiving, from the model, a second likelihood that the second audio data is associated with the classification; and based at least in part on the first likelihood and the second likelihood, at least one of: determining a direction of arrival value associated with a source of the first audio data or the second audio data; or determining a level of computational processing associated with another model for determining data for the source of the first audio data or the second audio data.

R: One or more non-transitory computer-readable media as paragraph Q describes, the operations further comprising: determining that the first audio data or the second audio data is associated with an emergency event; and determining the direction of arrival value associated with the emergency event.

S: One or more non-transitory computer-readable media as paragraphs Q or R describe, the operations further comprising: receiving, as pose data, one or more of position data or orientation data associated a first audio sensor associated with the first audio data; and determining, based at least in part on the first likelihood, the second likelihood, and the pose data, the direction of arrival value associated with the first audio data or the second audio data.

T: One or more non-transitory computer-readable media as paragraphs Q-S describe, the operations further comprising: sending the first likelihood and the second likelihood to the other model; and causing the other model to determine a threshold associated with a sensor based at least in part on the first likelihood and the second likelihood.

While the example clauses described above are described with respect to one particular implementation, it should be understood that, in the context of this document, the content of the example clauses can also be implemented via a method, device, system, computer-readable medium, and/or another implementation.

Additionally, any of examples A-# may be implemented alone or in combination with any other one or more of the examples A-#.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving first audio data from a first audio sensor associated with a vehicle;
receiving second audio data from a second audio sensor associated with the vehicle;
inputting the first audio data and the second audio data into a model;
receiving, from the model, a first classification of the first audio data, the first classification including a first probability that the first audio data is associated with a sound class;
receiving, from the model, a second classification of the second audio data, the second classification including a second probability that the second audio data is associated with the sound class; and
based at least in part on the first probability that the first audio data is associated with the sound class and the second probability that the second audio data is associated with the sound class, at least one of:
determining a direction of arrival associated with a source of the first audio data or the second audio data; or
determining a level of computational processing associated with another model for determining data for the source of the first audio data or the second audio data,
wherein the first classification and second classification comprises an emergency event or a non-emergency event.

2. The system of claim 1, wherein the first classification comprises a first classification value representing a likelihood that the first audio data is associated with the first classification and the second classification comprises a second classification value representing a likelihood that the second audio data is associated with the second classification, and
wherein the operations further comprise determining, based at least in part on a difference between the first classification and the second classification, the direction of arrival associated with the first audio data or the second audio data.

3. The system of claim 2, the operations further comprising:
receiving, as pose data, position data and orientation data associated the first audio sensor; and
determining, based at least in part on the first classification value, the second classification value, and the pose data, the direction of arrival associated with the source of the first audio data or the second audio data.

4. The system of claim 3, the operations further comprising:
determining, based at least in part on the first classification of the second classification, that the first audio data or the second audio data is associated with the emergency event; and
determining an action to control the vehicle in an environment based at least in part on the direction of arrival associated with the emergency event.

5. The system of claim 1, wherein the sound class comprises one or more of: an emergency sound class, a non-emergency sound class, an engine sound class, a music sound class, a thundering sound class, an animal sound class, an ambulance siren sound class, a police siren sound class, a fire truck siren sound class, a power tool sound class, a reverse direction sound class, a honking sound class or a speech sound class.

6. A method comprising:
receiving first audio data;
receiving second audio data;
inputting the first audio data and the second audio data into a model comprising one or more classifiers;
receiving, from the model, a first classification value indicative of a likelihood that the first audio data is associated with a classifier of the one or more classifiers;
receiving, from the model, a second classification value indicative of a likelihood that the second audio data is associated with the classifier of the one or more classifiers; and
based at least in part on the first classification value and the second classification value, at least one of:
determining a direction of arrival value associated with a source of the first audio data or the second audio data; or
determining a level of computational processing associated with another model for determining data for the source of the first audio data or the second audio data,
wherein the first classification and second classification comprises an emergency event or a non-emergency event.

7. The method of claim 6, wherein the classifier comprises one or more of: an emergency sound class, a non-emergency sound class, an engine sound class, a music sound class, a thundering sound class, an animal sound class, an ambulance siren sound class, a police siren sound class, a fire truck siren sound class, a power tool sound class, a reverse direction sound class, a honking sound class or a speech sound class.

8. The method of claim 6, further comprising:
based at least in part on determining the level of computational processing, sending the first classification value and the second classification value to the other model; and
causing the other model to determine a threshold associated with a sensor based at least in part on the first classification value and the second classification value.

9. The method of claim 6, wherein determining the level of computational processing comprises determining an amount of computational processing or memory capacity to allocate during subsequent processing of an object associated with the first audio data or the second audio data.

10. The method of claim 6, further comprising:
determining an action to control a vehicle in an environment based at least in part on the direction of arrival value associated with the source of the first audio data or the second audio data.

11. The method of claim 9, wherein:
the first audio data is associated with a first audio sensor,
the second audio data is associated with a second audio sensor, and
determining the direction of arrival value associated with the first audio data or the second audio data is further based at least in part on one or more of position data or orientation data associated with at least one of the first audio sensor or the second audio sensor.

12. The method of claim 9, wherein the direction of arrival value is a first direction of arrival value, the method further comprising:
determining, based at least in part on at least one of: a magnitude difference between the first audio data and the second audio data or a time difference between the first audio data and the second audio data, a second direction of arrival value.

13. The method of claim 6, wherein:
the first audio data is associated with a first signal captured by a first audio sensor and a second signal captured by a second audio sensor, and
the second audio data is associated with a third signal captured by a third audio sensor and a fourth signal captured by a fourth audio sensor.

14. The method of claim 10, further comprising:
determining that the first audio data or the second audio data are associated with the emergency event; and
wherein controlling the vehicle comprises at least one of stopping the vehicle or determining a trajectory for the vehicle to follow in the environment.

15. The method of claim 6, further comprising:
identifying an intensity or a frequency of sound associated with the first audio data and the second audio data;
determining the first classification value based at least in part on the intensity or the frequency of sound associated with the first audio data; and
determining the second classification value based at least in part on the intensity or the frequency of sound associated with the second audio data.

16. The method of claim 6, wherein the model is a first model and the direction of arrival value is a first direction of arrival value, further comprising:
sending information associated with the first classification value and the second classification value to a second model; and
receiving, from the second model, one or more of:
a second direction of arrival value associated with the source of the first audio data or the second audio data;
a probability that the first audio data and the second audio data are associated with a same class;
a probability that the first audio data and the second audio data are associated with a same object in an environment; or
a probability that the first audio data is associated with a first object in an environment and the second audio data is associated with a second object in the environment.

17. One or more non-transitory computer-readable media storing instructions executable by a processor, wherein the instructions, when executed, cause the processor to perform operations comprising:

receiving first audio data;

receiving second audio data;

inputting the first audio data and the second audio data into a model comprising one or more classifiers;

receiving, from the model, a first classification value indicative of a likelihood that the first audio data is associated with a classifier of the one or more classifiers;

receiving, from the model, a second classification value indicative of a likelihood that the second audio data is associated with the classifier of the one or more classifiers; and based at least in part on the first classification value and the second classification value, at least one of:

determining a direction of arrival value associated with a source of the first audio data or the second audio data; or determining a level of computational processing associated with another model for determining data for the source of the first audio data or the second audio data, wherein the first classification and second classification comprises an emergency event or a non-emergency event.

18. The one or more non-transitory computer-readable media of claim 17, the operations further comprising:

determining that the first audio data or the second audio data is associated with the emergency event; and determining the direction of arrival value associated with the emergency event.

19. The one or more non-transitory computer-readable media of claim 17, the operations further comprising:

receiving, as pose data, one or more of position data or orientation data associated a first audio sensor associated with the first audio data; and determining, based at least in part on the first classification value, the second classification value, and the pose data, the direction of arrival value associated with the first audio data or the second audio data.

20. The one or more non-transitory computer-readable media of claim 17, the operations further comprising:

based at least in part on determining the level of computational processing, sending the first classification value and the second classification value to the other model; and causing the other model to determine a threshold associated with a sensor based at least in part on the first classification value and the second classification value.

* * * * *